June 22, 1965     P. WARGO     3,191,078
ELECTROMAGNETIC OSCILLATING TO ROTARY
Filed Nov. 29, 1962
FIG. 1.
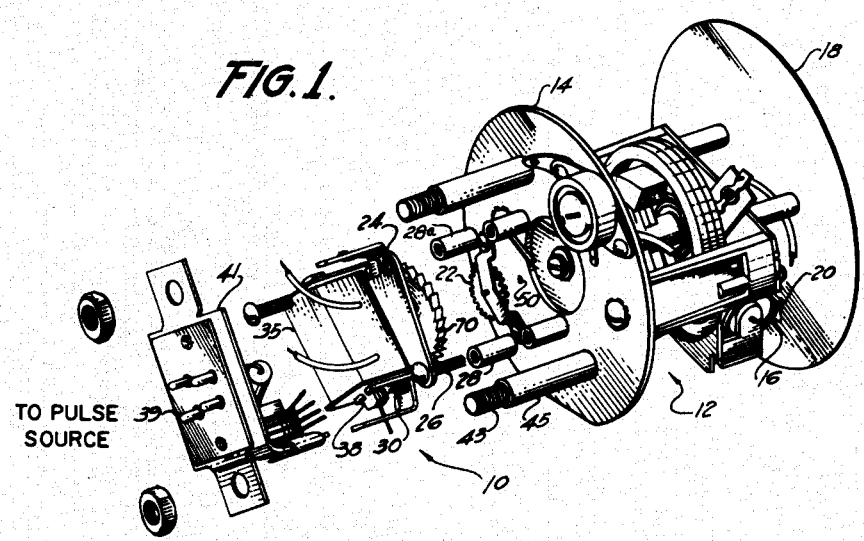
TO PULSE SOURCE
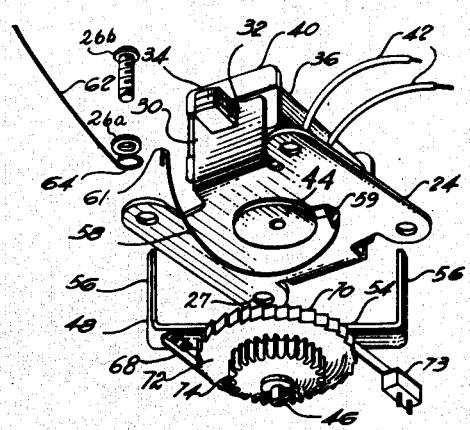
FIG. 2.
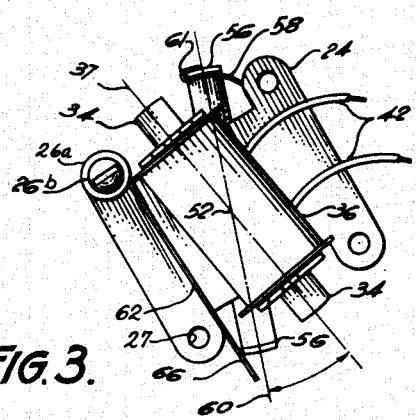
FIG. 3.
INVENTOR
Peter Wargo
By William J. Newman
Attorney

# 3,191,078
ELECTROMAGNETIC OSCILLATING TO ROTARY DRIVE

Peter Wargo, Maywood, Ill., assignor to Stewart-Warner Corporation, Chicago, Ill., a corporation of Virginia
Filed Nov. 29, 1962, Ser. No. 240,861
7 Claims. (Cl. 310—37)

This invention relates to odometer drive mechanisms and more particularly to odometer drive mechanisms which operate responsive to the receipt of electrical pulses.

The odometer drive mechanism of this invention was designed for use with an electrically energized speedometer in which an electric signal is transmitted thereto responsive to the speed of the vehicle. The electrical signal replaces the mechanical drive shaft of ordinary speedometers so that an electric signal must also be used to operate the mileage measuring odometer. The electric signal for energizing the odometer driving mechanism comprises pulses, the sum of which are indicative of the distance traveled.

Generally electric odometer drive mechanisms comprise an electromagnet energizable by the electric pulses received from a sender, and an armature driven in an oscillatory manner responsive to the pulses. The oscillatory motion of the armature is transformed to rotary motion which is transmitted to the odometer, perhaps through a gear train.

In the past electrically driven odometer drive mechanisms of this general type had two major failings in that they were noisy and/or inaccurate. It is necessary in these devices that the stroke of the armature be substantially constant in amplitude so that each pulse received by the electromagnet advances the odometer a fixed amount. Prior art odometer drive mechanisms operated to advance the odometer responsive to the receipt of a signal from the sender. It has been found, however, that inaccuracies are present in this type of system in view of the inertia of the moving members of the device. The flywheel effect of the moving parts, especially at high speeds, can cause excessive advancement of the odometer for each pulse received. Thus, the odometer overstates the distance actually traveled by the vehicle.

It was heretofore necessary to provide mechanical stops at the desired limits of armature travel to standardize the advancement of the odometer pulse received. The contact between the armature and the limit stops, of course, created noise which generally increased intensity with the speed of the vehicle. A noticeable ticking can thus be heard which is bothersome to the vehicle operator.

It is, therefore, an object of this invention to provide an odometer drive mechanism which operates with the minimum amount of noise from interacting parts.

It is also an object of this invention to provide an odometer drive mechanism in which the inertia of its moving parts has no effect on the accuracy of the odometer reading.

A further object of this invention is to provide an electrically operated odometer drive mechanism which is rugged and simple in construction while providing reliability in operation.

Other objects and features of this invention will be apparent from the following description of the embodiment shown in the accompanying drawings, in which:

FIG. 1 is an isometric exploded view of the odometer drive mechanism showing its construction and relation with an electrically driven speedometer;

FIG. 2 is a partially exploded isometric view of the odometer drive mechanism as viewed approximately along the line 2—2 of FIG. 1 showing the armature and ratchet assembly; and FIG. 3 is an end view of the odometer drive mechanism showing the angular relationship between the electromagnet and the armature at its "at rest" position.

An odometer driving mechanism embodying the teachings of this invention comprises an electromagnet having a core defining a line of greatest magnetic attraction and an armature mounted and shaped to be pulled positively into alignment with the line upon energization of the electromagnet. Spring means are provided constraining the armature to a position outside of alignment with said line in an "at rest" position defined by a cantilever spring. The armature carries a pawl for engagement with a ratchet wheel to advance the ratchet wheel when the armature is moving away from the line of greatest magnetic attraction, and detent means are provided for preventing the movement of the ratchet wheel during movement of the armature toward the line of greatest magnetic attraction.

Reference is now made to the drawings and especially FIG. 1 wherein is shown an odometer drive mechanism 10 in conjunction with an electrically driven speedometer 12. The odometer drive mechanism 10 is mounted on a plate member 14 which also serves as the main mounting means for the speedometer unit 12. The dials of the odometer 16 are mounted immediately adjacent the back of face dial 18 which has an aperture 20 to facilitate visual observance of the odometer reading. Gear means including gear 22 link the odometer 16 to the drive mechanism 10 as hereinafter described.

The odometer drive mechanism 10 comprises a mounting bracket 24 spacially mounted from the plate member 14 by means of four bolts 26 and spacers 28. Bracket 24 has a pair of lugs 30 extending from the bracket in a direction away from the mounting member 14 with recesses 32 in the ends thereof for receiving the core ends or poles 34 of electromagnet 36. The electromagnet 36 is held in rigid assembly with the bracket by crimping the ends of the lugs 30 as shown at 38. The coil 35 of the electromagnet 36 is wound about a spool 40 having a central cavity therethrough for receiving the soft iron core with ends 34. The core ends 34 extend symmetrically out from either end of the coil to define a line of greatest magnetic attraction 37 as shown in FIG. 3.

Leads 42 connect the electromagnet to a male plug 39 mounted on a separate bracket 41 held in spacial relationship from the plate member 14 and the drive mechanism 10 by means of bolts 43 and spacers 45. The plug 39 mates with a receptacle (not shown) connected to a pulse sender.

The bracket 24 carries a bearing plate 44 which receives one end of shaft 46 mounting the armature 48. The other end of the shaft 46 is received in aperture 50 (FIG. 1) in the plate member 14. As may be seen in FIG. 3, the shaft 46 and, hence, armature 48 are rotatable about an axis 52 which is perpendicular to and intersects the line of greatest magnetic attraction 37 defined by the poles 34.

The armature 48 is essentially U-shaped comprising a base portion 54 with legs 56 extending perpendicular therefrom so as to travel in a path about axis 52 adjacent the poles 34 of the electromagnet. The width of the legs 56 in a direction perpendicular to the line 37 and the axis 52 when the armature is aligned with the line 37 is approximately equal to the width of the poles 34 of the electromagnet as best shown in FIG. 3. Thus, the armature 48 will align itself with the line of greatest magnetic attraction 37 from a position at an angle with said line with the least amount of overshoot, upon the receipt of a pulse by the electromagnet 36.

A spring 58 has one end 59 fixed to the bracket 24 (FIG. 2) and the other end 61 in engagement with the armature leg 56 to constrain the armature to an "at rest" position 60 at an angle from the line of greatest magnetic attraction 37. The "at rest" position is defined by a cantilever spring 62 having a looped end 64 fixed to the bracket by means of one of the bracket mounting washers 26a and screws 26 which passes through aperture 27 (FIG. 2) and is received by spacer 28a (FIG. 1). The free end 66 extends into the path of travel of one of the legs 56 of the armature 48.

The above described construction of the electromagnet and armature provides an extremely quiet operating mechanism for converting the electric pulses into mechanical motion for driving the odometer. At the beginning of an electrical pulse the armature 48 is drawn to the line 37 of greatest magnetic attraction and is held there until the release of the pulse. Due to the equal widths of the core ends 34 and the armature legs 56 there is very little overshoot past the line 37 so that no mechanical stop is necessary. Hence no noise is generated by this movement. The resilient stop provided by the cantilever springs 62 at the "at rest" position of the armature limits the noise on the return of the armature to a practically inaudible level.

The armature 48 carries a pawl 68 for engagement with teeth 70 of a ratchet wheel 72 which is journaled for separate rotation about the shaft 46. A detent 73 is mounted on the plate member 14 and is adapted to engage teeth 70 to prevent rotation of the ratchet wheel 72 in one direction.

Attached to the ratchet wheel 72 for rotation therewith is a gear 22 (FIG. 1) which is linked to the odometer 16 through additional gearing means not disclosed.

As shown in FIG. 2 the pawl 68, detent 73 and gear teeth 70 are arranged so that the ratchet wheel 72 is advanced during the movement of the armature 48 from its position in alignment with the line 37 of greatest magnetic attraction to its "at rest" position 60 at the end of each electrical pulse. Thus, the force for advancing the ratchet wheel 72 is derived only from the spring 58. The force for overcoming the inertia of the system is constant for every pulse received regardless of the amplitude of the pulses. The force of the spring 58 is chosen so as to advance the ratchet wheel 72 one unit. It can be seen that if this force is too great, the inertia of the ratchet wheel along with the gear means coupled thereto will provide a flywheel affect to advance the wheel and hence the odometer more than one unit.

It the ratchet wheel is caused to the driven by the armature as it is moving towards the line 37 of greatest magnetic attraction the armature force for driving the ratchet wheel 72 will be variable responsive to the amplitude of the pulses. The pulses for the type of device are generally obtained from a sender which include a D.C. source and switching means to periodically interrupt the D.C. voltage. In vehicle electrical systems the voltage level of the D.C. source is variable over a considerable range and the amplitude of the pulses varies accordingly. If the ratchet wheel 72 is driven by the armature during the portion of the cycle when the D.C. voltage source is switched in the inertia of the wheel, the gearing means and the odometer may advance the wheel additional units by high voltage pulses to cause a misreading of the odometer.

In the drive mechanism described the force for rotating the ratchet wheel comes solely from the force of the return spring 58. The power portion of each cycle merely cocks the spring and armature to their alignment position, and they are held there until the pulse releases. The spring causes the armature to return to its "at rest" position with a predetermined force dictated solely by the resiliency of the spring. The gear teeth ratios may be accurately selected for the proper stopping of the odometer relative to the distance traveled. The lack of rigid mechanical stops for limiting armature travel provides for practically noiseless operation.

While there has been one embodiment of the invention shown and described herein, it is recognized that many modifications and additions may be made thereto. It is, therefore, to be understood that the invention is to be limited only by the scope of the appending claims.

What is claimed is:

1. A driving mechanism for an odometer or the like comprising an electro-magnet having a coil disposed about a non-permanent magnetic core, said core having a pair of poles extending from opposite ends of said coil to define a line of greatest magnetic attraction, a U-shaped armature of non-permanent magnetic material having a base and two leg portions journaled for oscillatory rotation about a shaft perpendicular to and intersecting said line midway between said poles, a cantilever spring having its free end in the path of travel of said armature to define a stop for said armature away from a position aligned with said line, a second spring for constraining said armature against said cantilever spring means for electrically pulsing said coil to periodically attract said armature leg portions into alignment with said line, said leg portions and said poles having approximately equal widths along a direction perpendicular to said line and said axis when said leg portions are aligned with said line, a ratchet wheel having teeth and mounted for separate rotation about said shaft, a pawl on said armature adapted to engage said teeth for rotating said ratchet wheel only as said armature moves toward said stop, a detent mounted and adapted to engage said teeth to prevent rotation of said ratchet wheel as said armature moves away from said stop, and gear means operable with said ratchet wheel for driving said odometer.

2. A driving mechanism for an odometer or the like comprising an electromagnet having a coil disposed about a non-permanent magnetic core, said core having a pair of holes extending from opposite ends of said coil to define a line of greatest magnetic attraction, a U-shaped armature of non-permanent magnetic material having a base and two legs portions, a shaft in said base portion journaled for oscillatory rotation about an axis perpendicular to and intersecting said line midway between said poles, said armature rotatable to position said leg portions into and out of alignment with said line of greatest magnetic attraction, said leg portions and said poles having approximately equal widths along the direction of travel of said legs and substantially similar shaped confronting edges perpendicular to the direction of travel, a cantilever spring having its free end in the path of travel of one of said leg portions of said armature to define a stop for said armature away from a position aligned with said line, a second spring for constraining said armature against said cantilever spring, a ratchet wheel having teeth and mounted for separate rotation about said shaft, a pawl on said armature adapted to engage said teeth for rotating said ratchet wheel only as said armature moves toward said stop, a detent mounted and adapted to engage said teeth to prevent rotation of said ratchet wheel as said armature moves away from said stop, and gear means operable with said ratchet wheel for driving said odometer.

3. A driving mechanism for an odometer or the like comprising an electromagnet having a coil disposed about a non-permanent magnetic core, said core having a pair of poles extending from opposite ends of said coil to define a line of greatest magnetic attraction, bracket means mounting said electro-magnet, a U-shaped armature of non-permanent magnetic material having a base and two leg portions, a shaft in said base portion journaled in said bracket for oscillatory rotation about an axis perpendicular to and intersecting said line midway between said poles, said armature rotatable to position said leg portions into and out of alignment with said line of greatest magnetic attraction, said leg portions and said poles having approximately equal widths along the direction of travel of said legs and substantially similar shaped confronting edges perpendicular to the direction of travel, a cantilever spring attached to said bracket with its free end in the path of travel of one of said leg portions of said armature to define a stop away from a position aligned with said line, a second spring having one end attached to said bracket and the other end to said armature to constrain said armature against said cantilever spring, a ratchet wheel having teeth and mounted for separate rotation about said shaft, a pawl on said armature adapted to engage said teeth for rotating said ratchet wheel only as said armature moves toward said stop, a detent mounted and adapted to engage said teeth to prevent rotation of said ratchet wheel as said armature moves away from said stop, and gear means operable with said ratchet wheel for driving said odometer.

4. A driving mechanism for an odometer or the like comprising an electromagnet having a core defining a line of greatest magnetic attraction, an armature mounted for movement into and out of alignment with said line, spring means constraining said armature to a position out of alignment with said line, a cantilever spring stop defining said position, and means operably responsive to said armature for driving said odometer.

5. A driving mechanism for an odometer or the like comprising an electromagnet having a coil disposed about a non-permanent magnetic core, said core having a pair of poles extending from opposite ends of said coil to define a line of greatest magnetic attraction, a U-shaped armature of non-permanent magnetic material having a base and two leg portions, a shaft in said base portion journaled for oscillatory rotation about an axis perpendicular to and intersecting said line midway between said poles, said armature rotatable to position said leg portions into and out of alignment with said line of greatest magnetic attraction, said leg portions and said poles having approximately equal widths along the direction of travel of said legs and substantially similar shaped confronting edges perpendicular to the direction of travel, a cantilever spring having its free end in the path of travel of one of said leg portions of said armature to define a stop for said armature away from a position aligned with said line, a second spring for constraining said armature against said cantilever spring, and means operable responsive to said armature for driving said odometer.

6. A driving mechanism for an odometer or the like comprising an electromagnet having a coil disposed about a non-permanent magnetic core, said core having a pair of poles extending from opposite ends of said coil to define a line of greatest magnetic attraction, a U-shaped armature of non-permanent magnetic material having a base and two leg portions journaled for oscillatory rotation about an axis perpendicular to and intersecting said line midway between said poles, a spring having its free end in the path of travel of said armature to define a stop for said armature away from a position aligned with said line, a second spring for constraining said armature against said cantilever spring, means for electrically pulsing said coil to periodically attract said armature leg portions into alignment with said line, said leg portions and said poles having approximately equal widths along a direction perpendicular to said line and said axis when said leg portions are aligned with said line and substantially similar shaped confronting edges perpendicular to said direction.

7. A driving mechanism for an odometer or the like comprising an electromagnet having a coil disposed about a non-permanent magnetic core, said core having a pair of poles extending from opposite ends of said coil to define a line of greatest magnetic attraction, bracket means mounting said electromagnet, a U-shaped armature of non-permanent magnetic material having a base and two leg portions, a shaft in said base portion journaled in said bracket for oscillatory rotation about an axis perpendicular to and intersecting said line midway between said poles, said armature rotatable to position said leg portions into and out of alignment with said line of greatest magnetic attraction, said leg portions and said poles having approximately equal widths along the direction of travel of said legs and substantially similar shaped confronting edges perpendicular to the direction of travel, a cantilever spring attached to said bracket with its free end in the path of travel of one of said leg portions of said armature to define a stop for said armature away from a position aligned with said line, and a second spring having one end attached to said bracket and the other end to said armature to constrain said armature against said cantilever spring, and means operably responsive to said armature for driving said odometer.

References Cited by the Examiner
UNITED STATES PATENTS

| 979,637 | 12/10 | Backer | 310—37 |
| 1,692,409 | 11/28 | Hobbs | 310—37 X |
| 2,554,517 | 5/51 | Bramley | 58—41 |

MILTON O. HIRSHFIELD, *Primary Examiner.*

LEO SMILOW, *Examiner.*